United States Patent
Jevremovic et al.

(10) Patent No.: US 6,275,482 B1
(45) Date of Patent: Aug. 14, 2001

(54) COMBINED ANGULAR, SPATIAL, AND TEMPORAL DIVERSITY FOR MOBILE RADIO SYSTEM

(75) Inventors: Vladan M. Jevremovic, Longmont; Patrick L. Perini, Broomfield, both of CO (US)

(73) Assignee: Qwest Communications International Inc., Denver, CO (US)

( * ) Notice: Subject to any disclaimer, the term of this patent is extended or adjusted under 35 U.S.C. 154(b) by 0 days.

(21) Appl. No.: 08/958,943

(22) Filed: Oct. 28, 1997

(51) Int. Cl.$^7$ .................................................. H04Q 7/00
(52) U.S. Cl. ...................... 370/334; 370/335; 455/562; 342/375
(58) Field of Search ..................................... 370/320, 331, 370/332, 335, 342, 334, 441, 479, 339; 375/205, 299, 347; 455/136, 135, 134, 101, 440, 441, 443, 444, 456, 524, 562; 342/375, 373, 374

(56) References Cited

U.S. PATENT DOCUMENTS

| | | |
|---|---|---|
| 5,581,260 | 12/1996 | Newman . |
| 5,596,329 * | 1/1997 | Searle et al. .......................... 342/374 |
| 5,602,833 * | 2/1997 | Zehavi et al. ......................... 370/209 |
| 5,602,903 * | 2/1997 | LeBlanc et al. ....................... 379/60 |
| 5,654,979 * | 8/1997 | Levin et al. .......................... 375/206 |
| 5,710,768 * | 1/1998 | Ziv ...................................... 370/342 |
| 5,781,541 * | 7/1998 | Schneider ............................ 370/335 |
| 5,893,033 * | 4/1999 | Keskitalo et al. .................... 455/437 |
| 6,005,516 * | 12/1999 | Reudink et al. ..................... 342/375 |
| 6,104,935 * | 8/2000 | Smith et al. ......................... 455/562 |
| 6,125,109 * | 9/2000 | Fuerter ................................. 370/315 |

* cited by examiner

Primary Examiner—Chau Nguyen
Assistant Examiner—Soon-Dung Hyun
(74) Attorney, Agent, or Firm—Brooks & Kushman P.C.

(57) ABSTRACT

A base station for use in a CDMA mobile radio communication system utilizes a combined angular, spatial, and temporal diversity antenna architecture to improve reverse link gain and coverage. The architecture is formed from a first and second diversity narrow beamwidth antenna element arranged to receive CDMA signals from a predetermined geographic coverage area. Each antenna element is oriented so that respective peak boresights form a 45 to 60° angle with respect to each other, and are slanted 22.5 to 30° with respect to a sector boresight. The first and second antenna elements are separated in distance by at least 10 wavelengths. A time delay can be connected to the outputs of the antenna elements to provide temporal diversity by delaying received signals by a predetermined period of time. A max ratio signal combiner continuously provides the best total input signal for a base station receiver.

18 Claims, 4 Drawing Sheets

COMBINED ANGULAR, SPATIAL, AND TEMPORAL DIVERSITY FOR MOBILE RADIO SYSTEM

TECHNICAL FIELD

The present invention generally relates to antenna systems utilized in mobile radio communication systems, and more particularly to a radio cell site antenna architecture which is capable of producing higher gain for improved communication performance.

BACKGROUND ART

Generally, wireless radio communication systems are employed to connect mobile radio/telephone users together. Implementation of such systems, also known as "cellular" telephone services or Personal Communication Services "PCS," has become commonplace, particularly in metropolitan areas. As shown in FIG. 1, typical system configurations divide up a particular geographic service area 10 into several smaller geographic cell sites 12. Communication within each cell site is provided by a fixed base station 14, and communication between the cell sites or between a cell site and a land based telephone network is controlled by a control call processor 16 located in a mobile telephone switching center 18. The mobile telephone switching center 18 is connected to a public switched telephone network 20.

The respective boundaries of each cell site 12 are generally defined by the transmission and reception range of the respective base stations. These cell boundaries typically overlap at adjoining edges to enable communication throughout the total service area by permitting mobile users 22 to move among the different cells without disrupting communication capabilities, i.e., cell site hand-offs.

In order to allow a large number of users to have simultaneous access to an otherwise limited band-width, typical cellular systems employ either frequency division multiple access (FDMA), time division multiple access (TDMA), or code division multiple access (CDMA) as a system access protocol. Of particular concern to the present invention is a CDMA protocol.

In contrast to FDMA and TDMA, CDMA allows multiple users to simultaneously share all time and frequency resources of the system. This is generally achieved by assigning each user a unique pseudo-random code or identification code which is then used during modulation and demodulation of transmitted signals. An identical code is used at the other end of the transmission to only allow receipt of data that has a matching code sequence. Because the unique code effectively spreads the spectrum of the transmitted signal beyond that which is needed for transmitting the baseband signal, CDMA facilitates rejection of unwanted signals, thereby enhancing system performance in highly noisy environments.

Each base station employs an antenna system arranged to be capable of communicating signals throughout a particular cell's coverage area. One important aspect in the operation of a base station antenna system is to optimize of the strength of signals communicated with mobiles located at the outer boundary. With respect to signals transmitted from the base station to a mobile user, i.e., a downlink channel, weakness of the signal can be overcome merely by increasing the level of power for the base station's transmitter. However, reliable base station reception of signals sent by mobile users, i.e., via an uplink channel, are more problematic due to typical low gain designs of conventional mobile transceivers.

In addition, because of the inherently noisy environment and potential for multi-path signal fading, known CDMA base station antenna systems generally employ spatial or frequency diversity as a mechanism for improving transmission reliability. More specifically, with spatial diversity, the antenna system includes at least two downlink antennas physically separated either horizontally or vertically by an appreciable number of wavelengths. The respective outputs of the antennas are supplied to a processor for determining which antenna is receiving the best quality signal. The best signal path is subsequently connected to the receiver subsystem of the base station. With a wideband signal like that used in CDMA systems, different frequencies will selectively fade in the 1.25 Mhz channel. This frequency diversity arrangement mitigates signal outages due the effects of Rayleigh or "fast" fading.

While spatial and frequency diversity arrangements improve uplink channel performance, a need still exists for a base station antenna architecture which improves uplink performance, particularly in congested metropolitan areas. While it is possible to provide higher gain simply by increasing the size of the respective antennas, such a solution may not be feasible due to physical space constraints or cost.

DISCLOSURE OF THE INVENTION

It is therefore an object of the present invention to provide an improved method and system for reception of CDMA transmitted signals which increases reverse link budget and therefore reverse link coverage.

It is another object of the present invention to provide an improved method and system for diversity reception of CDMA transmitted signals in a cellular or PCS system.

It is a further object of the present invention to provide a base station for use in a CDMA cellular or PCS system which improves reverse link coverage by utilizing a combined angular, spatial, and temporal diversity antenna arrangement.

It is still a further object of the present invention to provide a base station for use in a CDMA cellular or PCS system which includes an antenna architecture having a combined 45–60° angular and spatial diversity to improve reverse link coverage.

It is still another object of the present invention to provide a base station for use in a CDMA cellular or PCS system which includes an antenna architecture having a combined 45–60° angular, spatial, and temporal diversity to improve reverse link coverage.

In accordance with these and other objects, a proffered embodiment of the present invention provides a base station for a CDMA mobile radio communication system having a combined diversity antenna architecture formed from a first and second narrow beamwidth antenna element arranged to receive CDMA signals transmitted from mobile transceivers located in a predetermined geographic coverage area. Each antenna element is oriented so a peak boresight forms a 45–60° angle with respect to the other element, and slanted 22.5 to 30° from a boresight of the sector coverage area. The first and second antenna elements are separated in distance by a multiple number of wavelengths. A signal combiner is provided for combining the outputs of the antenna assemblies, and is operative to provide the best qualitative signal to a receiver.

In accordance with another aspect of the present invention, a method for providing diversity reception of signals at a base station used in a CDMA mobile radio communication system comprises the steps of positioning a first and a second diversity narrow beamwidth antenna element so as to receive CDMA signals transmitted from mobile transceivers located in a predetermined geographic coverage area, and orienting each element so that a peak boresight forms a 45–60° angle with respect to the other element. The second antenna element is separated in distance from the first antenna element by a multiple number of wavelengths. All real time outputs of the first and second antenna elements are combined, and the path receiving the best qualitative signal is detected by a RAKE receiver in the CDMA base station.

In accordance with other aspects of the present invention, the method and system provide for delaying the outputs of one of the antenna assemblies to provide temporal diversity, and also providing a separation between the first and second antenna assemblies of a distance within the range of 10–20 wavelengths. In addition, a second redundant pair of antenna elements can be utilized.

The above objects and other objects, features, and advantages of the present invention are readily apparent from the following detailed description of the best mode for carrying out the invention when taken in connection with the accompanying drawings.

BEST MODE FOR CARRYING OUT THE INVENTION

Figure 1:
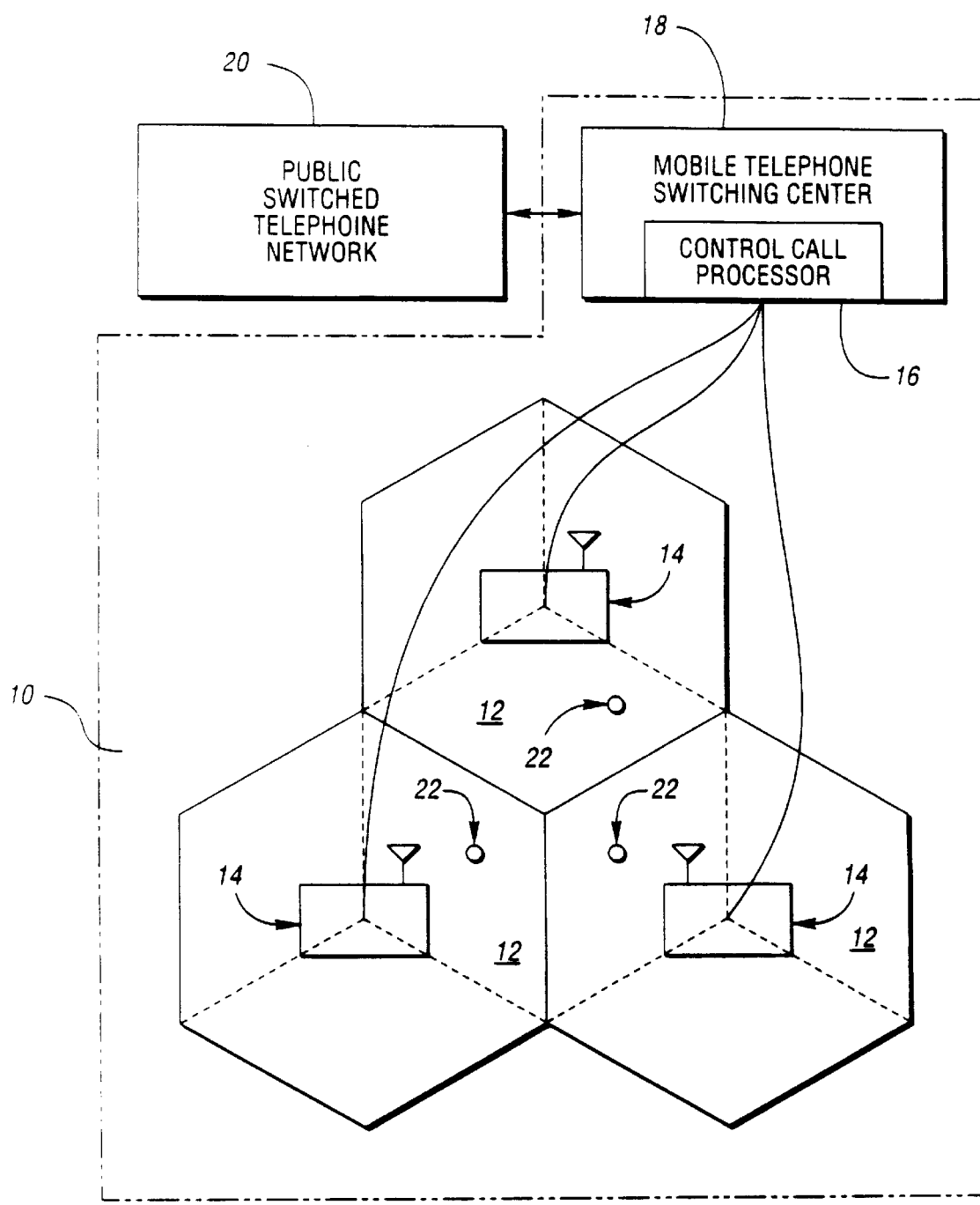
FIG. 1 is a block diagram of a typical cell site in a cellular communication system.
Figure 2:
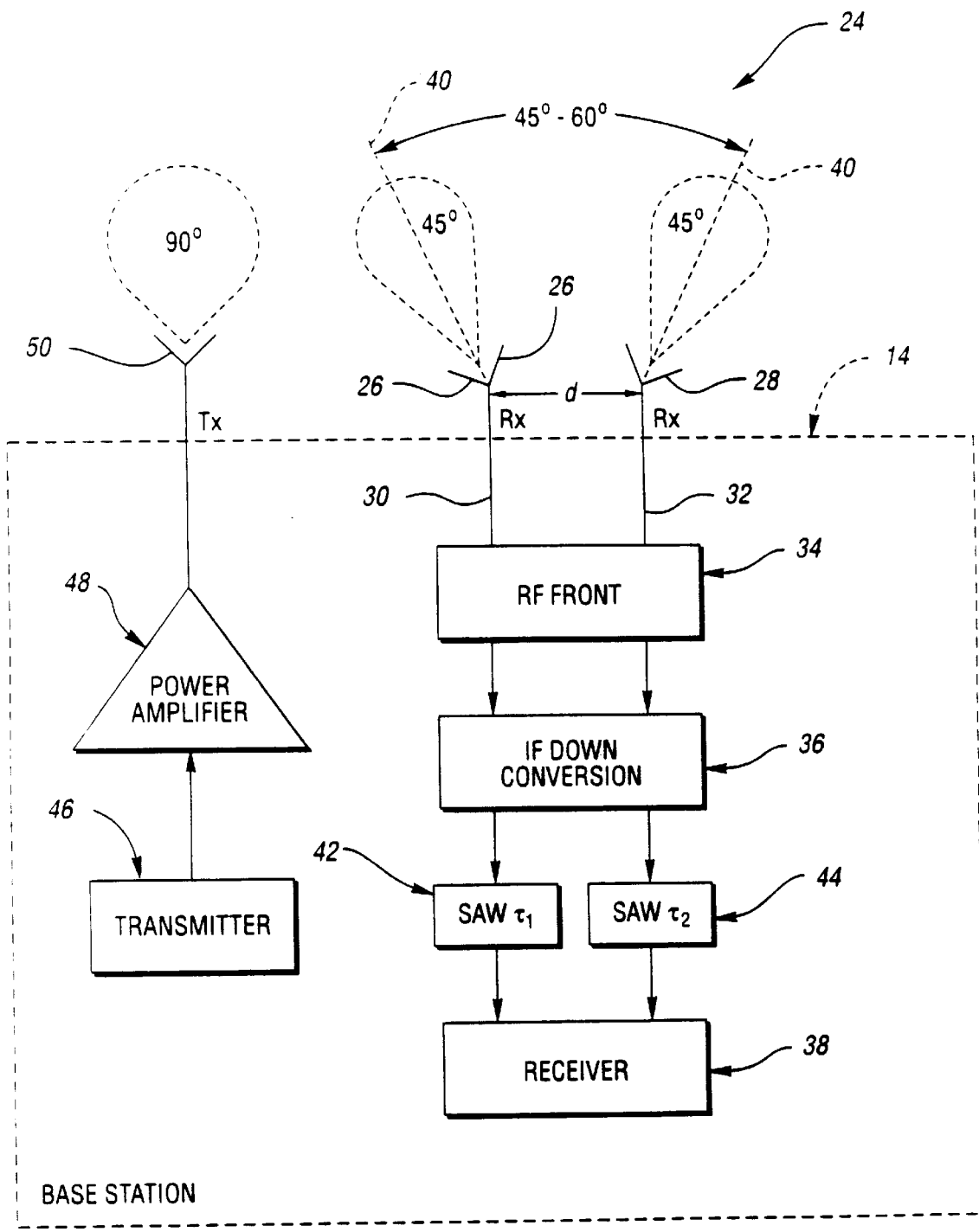
FIG. 2 is a block diagram of a cell site base station having a simplified implementation of a simplex space, angular, and temporal diversity antenna arrangement in accordance with the present invention.

Referring to FIG. 2, a block diagram is shown for a cellular or PCS CDMA base station 14 utilizing combined angular, spatial, and temporal diversity in accordance with a first simplex embodiment of the present invention. More specifically, combined angular, spatial, and temporal diversity is employed to receive CDMA signals transmitted by a mobile transceiver unit. Base station 14 includes an antenna architecture 24 consisting of a first antenna element 26, and a second antenna element 28 separated in physical space from the first element 26 by a distance d equal to 10–20 λ. The respective antenna elements are designed in accordance with known antenna principles so as to receive narrow beamwidth, high gain beams.

Outputs 30 and 32 of the antenna elements are coupled to an RF front end subsystem 34, which produces an output which is down converted to an IF frequency at down convertor subsystem 36. A receiver subsystem 38, such as a RAKE receiver having a suitable processor, provides final processing/demodulation of received signals.

In accordance with a preferred embodiment, antenna architecture 24 is designed to provide signal coverage for a conventional three 120° sector cell site implementation (coverage of only one of the sectors is illustrated in FIG. 2). To provide the desired angle diversity, the two elements 26 and 28 are squinted away from the boresight center of the sector so that each beam points between 22.5–30° away from the sector boresight. Such an arrangement achieves a 90° coverage as is typically provided for in a conventional 120° cell sector.

The separation of the two antenna elements provides the desired spatial diversity in accordance with the present invention. As noted above, individual angle diversity between the element pairs is realized by orienting the respective peak gains 40 of the beam boresights 22.5–30° off the broadside direction of the 120° sector. This in turn provides a separation of 45–60° between the element boresights, thereby resulting in each sector boresight having a crossover point which is down 3–5 dB as compared to the peak of the main beam gain.

In further accordance with the present invention, temporal diversity is achieved by requiring all signals sent to the base station to include a first reception of a signal followed by a redundant reception of the same signal after a predetermined delay. As shown in FIG. 2, separate delay subsystems 42 and 44 are connected to the outputs of the down convertor. The delay subsystems 42 and 44 can be implemented in any suitable manner, such as with a surface acoustic wave (SAW) filter implemented to operate on the IF signals. The delay subsystems operate to cause a corresponding delay $\tau_1$ or $\tau_2$ in the received signal as is well understood to one having ordinary skill in the art.

Receiver subsystem 38 further includes a combiner arrangement, such as a max ratio combiner, which combines the received signals together. Any suitable design can be used to implement the combiner as is well known to those skilled in the art. The combiner operates to continuously provide the best total input signal, which is then appropriately demodulated by receiver 38.

In addition, because the embodiment of base station 14 shown in FIG. 2 is a simplex arrangement, a transmitter subsystem 46 and power amplifier 48 are connected to a separate 90° transmitter antenna element 50 for transmitting signals to mobile transceiver units.

In operation, signals which are transmitted by a mobile transceiver on a "reverse link" are received via the different redundant multiple paths due to the combined angular, spatial, and temporal diversity provided by the antenna architecture 24 of the present invention. This combined with the use of higher gain, narrower beam antenna elements, allows the present invention to increase reverse link coverage without a significant modification to a CDMA base station architecture.

Figure 3:
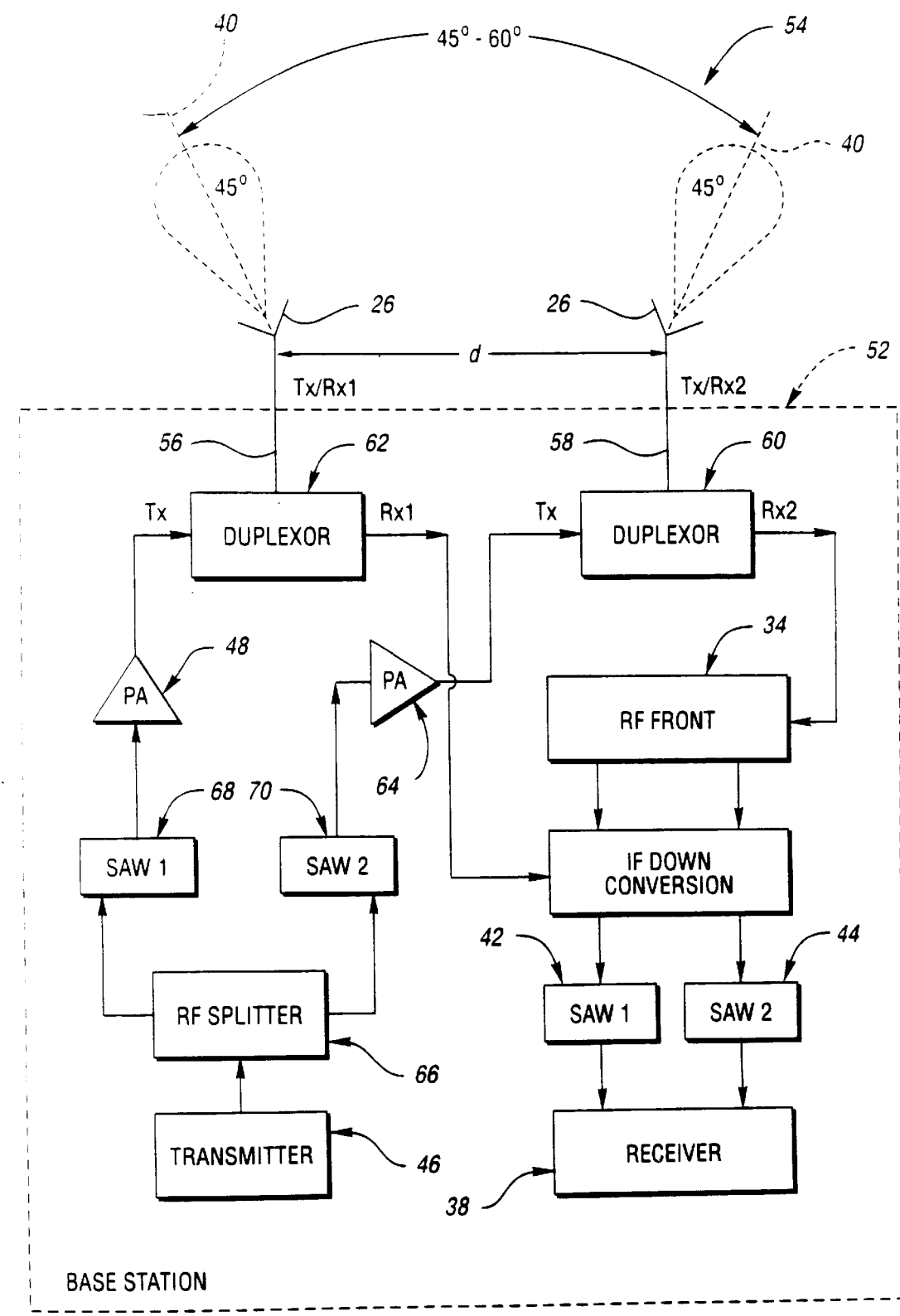
FIG. 3 is a block diagram of a cell site base station having a simplified implementation of a duplex space, angular, and temporal diversity antenna arrangement in accordance with the present invention.

Referring now to FIG. 3, a block diagram is shown for a cellular or PCS CDMA base station 14 utilizing combined angular, spatial, and temporal diversity in accordance with a second duplex embodiment of the present invention. Like elements as those in FIG. 2 have been denoted with the same reference number.

In this embodiment, base station 52 utilizes an antenna architecture 54 similar to architecture 24, except that elements 26 and 28 operate to both transmit and receive signals. The signal lines 56 and 58 to/from elements 26 and 28 are respectively coupled to one of a pair of duplexors 60 and 62. Duplexors 60 and 62 control flow of signals from elements 26 and 28 to front end 34, and to elements 26 and 28 from power amplifiers 48 and 64. A power splitter 66 splits a signal to be transmitted into separate paths, and appropriate delay subsystems (SAW 1 and SAW 2) 68 and 70 provide the appropriate delay $\tau_1$ or $\tau_2$ to effect the desired temporal diversity in the transmitted signal.

Figure 4:
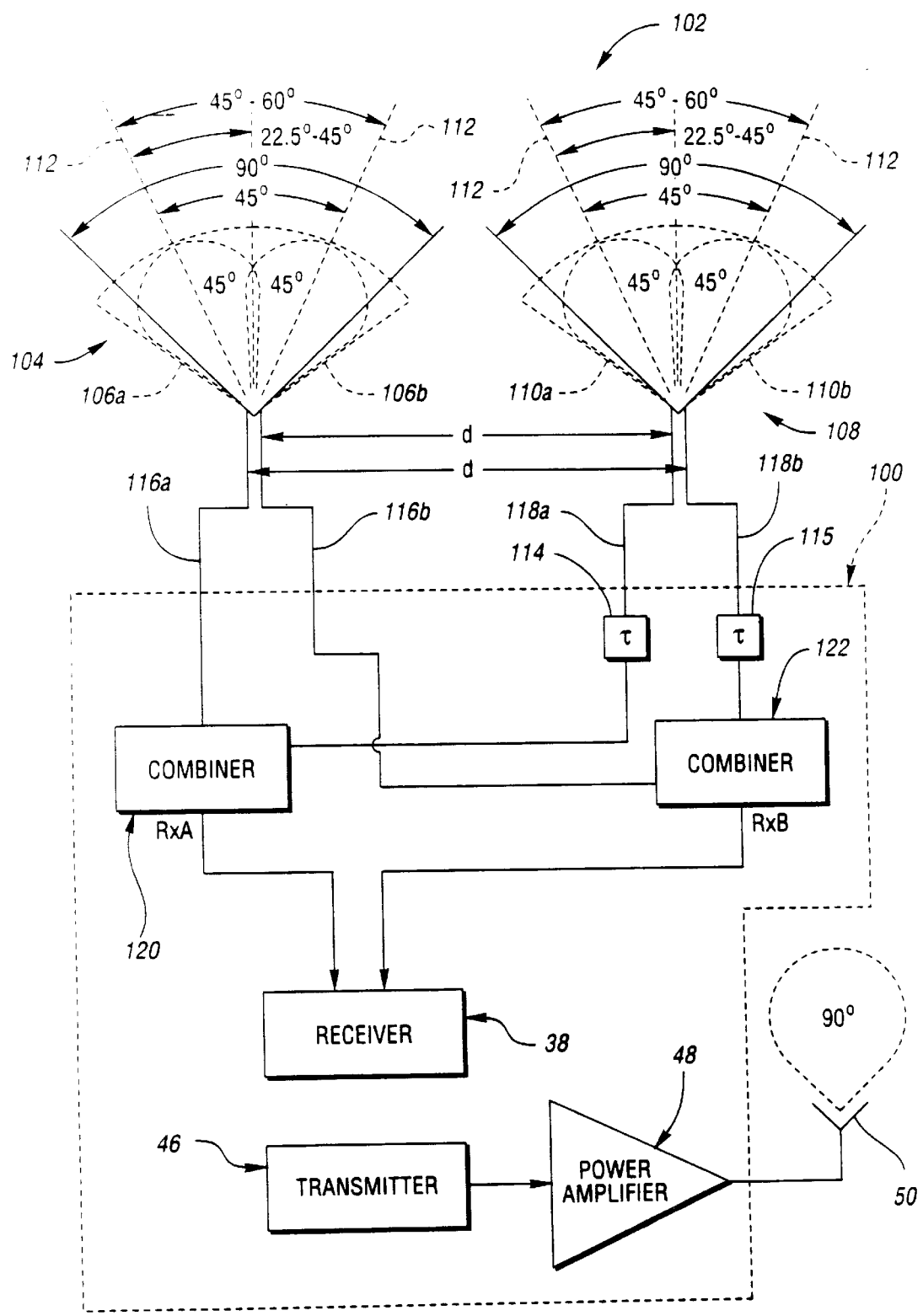
FIG. 4 is a block diagram of a cell site base station in accordance with a third embodiment of the present invention.

Referring now to FIG. 4, a block diagram is shown for a cellular or PCS CDMA base station 100 utilizing combined angular, spatial, and temporal diversity in accordance with a third embodiment of the present invention utilizing identical redundant antenna assemblies. Like elements as described in context with FIG. 2 have been denoted with the same reference number. It is noted that the embodiments of either FIG. 2 or FIG. 3 are preferred to the redundant antenna embodiment of FIG. 4 due to the simplified antenna architecture having fewer components and requiring less physical space.

In FIG. 4, an antenna architecture 102 consists of a first antenna assembly 104 formed by a set of antenna elements 106, and a similarly arranged second/redundant antenna assembly 108 formed by a set of antenna elements 110. The respective antenna elements are designed in accordance with known antenna principles so as to receive narrow beamwidth, high gain beams.

To provide the desired angle diversity, two adjacent beams of antenna assemblies 104 and 108 are squinted away from the boresight center of the sector so that each beam points between 22.5–30° away from the sector boresight. Such an arrangement achieves the 90° coverage typically provided for in a conventional 120° cell sector.

Antenna elements 106(a) and 110(a) are oriented to provide redundant coverage of the same half sector, but are separated in physical space by the distance d equal to 10–20 λ to provide the desired spatial diversity. Elements 106(b) and 110(b) are likewise oriented to cover the other half sector, and are also separated respectively by the distance d. Individual angle diversity between the element pairs 106a/106b and 110a/110b is realized by orienting the respective peak gains 112 of the beam boresights 22.5–30° off the broadside direction of the 120° sector. This in turn provides a separation of 45–60° between the element boresights, thereby resulting in each sector boresight having a crossover point which is down 3–5 dB as compared to the peak of the main beam gain.

Temporal diversity is achieved in this embodiment by connecting one of a pair of delay subsystems 114 and 115 to the outputs 116 or 118 of one of the antenna assemblies prior to processing by the base station RF front end. The delay subsystems have been illustrated as being coupled to outputs 118 of antenna assembly 108.

The delay subsystems 114 and 115 can be implemented such as with a surface acoustic wave (SAW) filter implemented at a base station IF (not shown in FIG. 4). The delay subsystems operate to cause a corresponding delay τ in the received signal.

The outputs 116a and 118a of the antenna elements 106a and 110a are supplied to a combiner 120. Likewise, the outputs 116b and 118b of elements 106b and 110b are supplied to combiner 122. The combiners operate to combine the respective input signals, and to continuously provide the best total input signal, which is then supplied to the receiver subsystem 38 for appropriate demodulation.

While the best mode for carrying out the invention has been described in detail, those familiar with the art to which this invention relates will recognize various alternative designs and embodiments for practicing the invention as defined by the following claims.

What is claimed is:

1. In a CDMA mobile radio communication system, a base station for communicating with a plurality of mobile transceivers comprising:

a first diversity narrow beamwidth antenna element arranged to receive CDMA signals transmitted from mobile transceivers located in a predetermined geographic coverage area;

a second diversity narrow beamwidth antenna element arranged to receive CDMA signals transmitted from mobile receivers located in the same predetermined geographic coverage area as said first antenna element, wherein said first and second antenna elements are oriented so that respective peak boresights form a 45 to 60° angle with respect to each other while being slanted 22.5 to 30° with respect to a boresight of the coverage area, and are separated in distance by a plurality of wavelengths and provide a sector crossover point between element pairs which is 3–5 Db down from a peak beam gain; and a receiver comprising a signal combiner for combining the outputs of said first and second antenna elements, wherein said signal combiner continuously provides the best qualitative signal to said receiver.

2. The base station of claim 1 wherein said first and second antenna elements are separated by a distance of at least 10 wavelengths.

3. The base station of claim 1 wherein said first and second antenna elements are separated by a distance in the range of 10 to 20 wavelengths.

4. The base station of claim 1 wherein said mobile radio communication system comprises a cellular or PCS system, and said first and second antenna elements are arranged to cover a 120° sector within a cell site controlled by said base station.

5. The base station of claim 4 wherein each antenna element covers a half of said 120° sector.

6. The base station of claim 1 further comprising a time delay subsystem connected to said first and second antenna elements for delaying received signals by a predetermined period of time, wherein said signal combiner combines the delayed time outputs.

7. The base station of claim 1 wherein said first and second antenna elements are arranged as a simplex antenna arrangement.

8. The base station of claim 1 further comprising a transmitter and a duplexor connected to said transmitter, receiver, and first and second antenna elements to provide a duplex antenna arrangement.

9. A method of providing diversity reception of signals at a base station used in a CDMA mobile radio communication system that comprises a cellular or PCS communication system, wherein said base station includes a receiver, said method comprising the steps of:

positioning a first narrow beamwidth antenna element so as to receive CDMA signals transmitted from mobile transceivers located in a predetermined geographic coverage area;

positioning a second narrow beamwidth antenna element so as to receive CDMA signals transmitted from mobile receivers located in the same predetermined geographic coverage area as said first antenna assembly, said second antenna element being separated in distance from said first antenna element by a plurality of wavelengths;

orienting said pair of antenna elements so that respective peak boresights form a 45 to 60° angle with respect to each other while being slanted 22.5 to 30° with respect to a boresight of the coverage area, wherein said first and second antenna elements are positioned to each cover a half of a 120° sector and the boresights of the antenna elements are oriented to provide a sector crossover point between elements which is 3 Db down from a peak beam gain;

combining all outputs of said first and second antenna assemblies; and connecting the combined output to the CDMA base station receiver for demodulation.

10. The method of claim 9 wherein said first and second antenna elements are separated by a distance of at least 10 wavelengths.

11. The method of claim 9 wherein said first and second antenna elements are separated by a distance in the range of 10 to 20 wavelengths.

12. The method of claim 9 wherein said first and second antenna elements are positioned to cover a 120° sector.

13. The method of claim 12 further comprising the step of orienting each antenna element so as to cover a half of said 120° sector.

14. The method of claim 9 further comprising the step of delaying the outputs of said first and second antenna elements to provide temporal diversity.

15. In a CDMA mobile radio communication system that comprises a cellular or PCS communication system, a base station for communicating with a plurality of mobile transceivers comprising:

a first diversity antenna assembly comprising a pair of narrow beamwidth antenna elements arranged to receive CDMA signals transmitted from mobile transceivers located in a predetermined geographic coverage area, wherein said pair of antenna elements are oriented so that respective peak boresights form a 45 to 60° angle with respect to each other while being slanted 22.5 to 30° with respect to a boresight of the coverage area;

a second diversity antenna assembly comprising a pair of narrow beamwidth antenna elements arranged to receive CDMA signals transmitted from mobile receivers located in the same predetermined geographic coverage area as said first antenna assembly, wherein said pair of antenna elements are oriented so that respective peak boresights form a 45 to 60° angle with respect to each other while being slanted 22.5 to 30° with respect to a boresight of the coverage area, and wherein said second antenna assembly is separated in distance from said first antenna assembly by a plurality of wavelengths;

a signal combiner for combining the outputs of said first and second antenna assemblies;

a receiver connected to said signal combiner for receiving the best qualitative signal;

said pair of narrow beamwidth antenna elements of both said first and second antenna assemblies each are arranged to cover half of a 120° sector within a cell site controlled by said base station; and the boresights of the respective antenna element pairs of said first and second antenna assemblies provide a sector crossover point between element pairs which is 3–5 Db down from a peak beam gain.

16. The base station claim 15 wherein said first and second multi-path antenna assemblies are separated by a distance of at least 10 wavelengths.

17. The base station claim 15 wherein said first and second multi-path antenna assemblies are separated by a distance in the range of 10 to 20 wavelengths.

18. The base station claim 15 further comprising a time delay connected to one of said first or second antenna assemblies for delaying all signals received by the connected antenna assembly by a predetermined period of time, wherein said signal combiner combines the delayed time outputs of the antenna assembly connected to said time delay and the real time outputs of the antenna assembly not connected to said time delay.

* * * * *